F. M. STEVENS.

Assignor of one-half interest to H. G. Holmes.

SPARK-ARRESTER.

No. 7,810. Reissued July 24, 1877.

ATTEST:

M Gardner

A Scott

INVENTOR:

Frank M. Stevens,

By J. S. Brown,

Ass't Attorney.

N. PETERS, PHOTO-LITHOGRAPHER, WASHINGTON, D. C.

UNITED STATES PATENT OFFICE.

FRANK M. STEVENS, OF CONCORD, NEW HAMPSHIRE, ASSIGNOR OF ONE-HALF INTEREST TO HENRY G. HOLMES.

IMPROVEMENT IN SPARK-ARRESTERS.

Specification forming part of Letters Patent No. 180,283, dated July 25, 1876; Reissue No. 7,810, dated July 24, 1877; application filed June 6, 1877.

DIVISION A.

*To all whom it may concern:*

Be it known that I, FRANK M. STEVENS, of Concord, in the county of Merrimack and State of New Hampshire, have invented certain Improvements in Spark-Arresters for Steam-Boilers, of which the following is a specification:

My invention relates to that class of spark-arresters in which the ascending products of combustion, freighted with sparks, &c., are caused to traverse a curve before reaching the exit, thus, by centrifugal force, throwing the heavier parts, consisting of sparks, dust, &c., to the outer wall of the curve, and in a greater or less degree separating them from the said products of combustion.

The invention consists, partly, in the elbow-pipe and its educts being so constructed and arranged as to form somewhat spiral or volute passages, to prevent retardation of the draft as much as possible.

It also consists, partly, in the several parts arranged in such a manner that a portion of the products of combustion, freighted with sparks, dust, &c., passes down into a spark-receiver, provided with an educt for the escape of the said gases or products of combustion, said educt insuring a circulation through the receiver, and permitting the deposition of the sparks therein.

It also consists in the various parts and combinations of parts, all as will be more specifically hereinafter set forth.

The drawings are adapted to illustrate the application of my spark-arrester to locomotive steam-engines, wherein the draft is assisted and accelerated in the usual manner by means of the exhaust steam.

Figure 1:
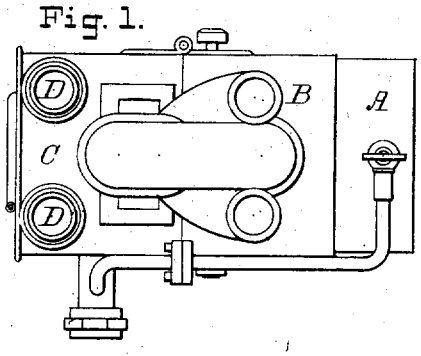
Figure 2:
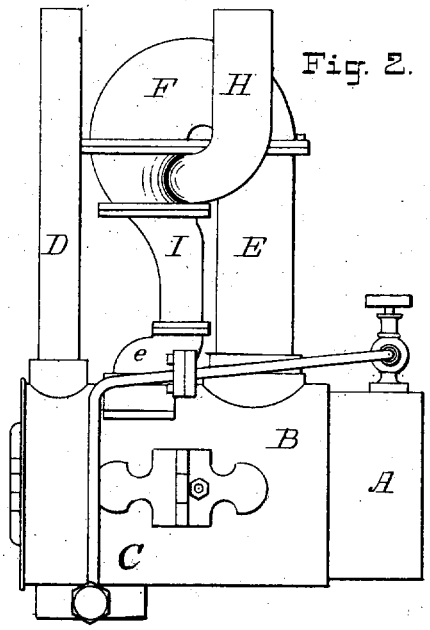
Figure 3:
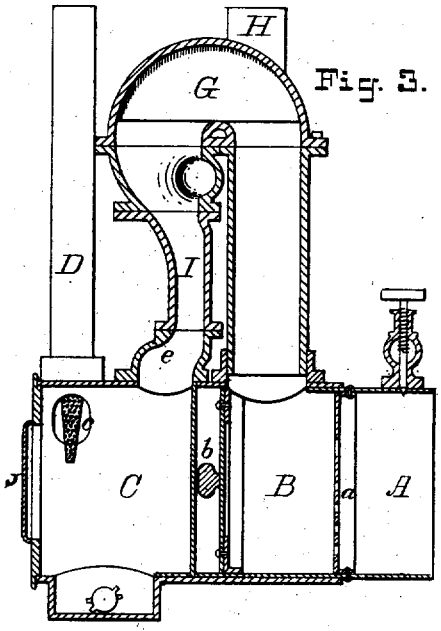
Figure 4:
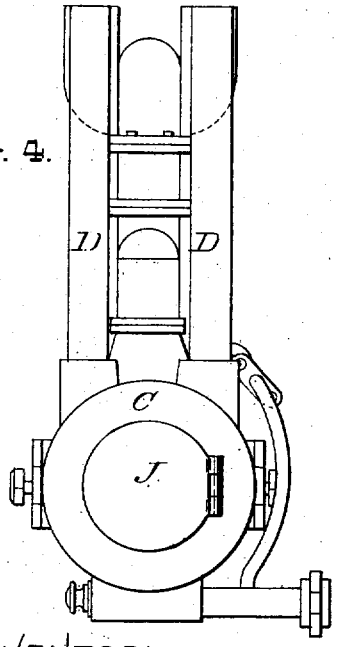
Figure 5:
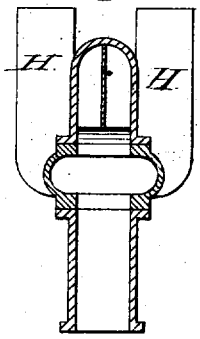

Figure 1 is a plan of my arrester. Fig. 2 is a side elevation of the same. Fig. 3 is a vertical mid-section of the same. Fig. 4 is a front view of the same. Fig. 5 is a vertical transverse section through the elbow-pipe.

In the drawings, A denotes the front end of a boiler, and *a* the front head or tube-sheet. B is the smoke arch or box, which I have shown as provided at its front end with a door, *b*, to give ready access to the interior of the same, and to the tubes for cleaning or repairs. In front of the smoke-box B is arranged a spark-receiver, C, consisting of a cylindrical or other proper shaped box or receptacle, substantially as shown. This receiver is provided with one or more educts or openings, D D. E is a chimney or smoke-stack, on the top of which is mounted the separator, consisting of the elbow-pipe F and educts H H. These are shown as formed of separate pieces and bolted together; but they may be cast or formed in one piece. G is a vertical partition, shown as fixed in the part F, so as to divide it longitudinally, and intended to assist in dividing the ascending current of gases into two parts. I is a conduit, connected with the wall of the separator or elbow-pipe above, and extending down to the opening or passage *e* into the receiver C.

The spark-receiver may be provided with an opening, J, closed with a door, and suitable apparatus for removing the sparks, &c., therefrom at convenient times.

As will be seen, my spark-arrester consists, essentially, of a separating mechanism, F H H, and a receiver, C, for the deposits.

In the operation the gaseous products, freighted with sparks and mixed with and propelled by exhaust steam in passing through the separator or elbow-pipe, are revolved in a manner so as to throw the said matters, by centrifugal force, to the outer wall, and finally cause them to pass down into the conduit I, whence they fall, or are carried by the force of a portion of the column of gases, into the receiver C, where they are arrested and deposited. That portion of the gaseous current which accompanies them passes out at the educt or opening D, and thus keeps up a circulation through the receiver. The main part of the column of gaseous products, split into two nearly equal portions, passes out at the educts H H with a minimum of retardation, owing to the almost perfect continuity of the two volute-like passages formed by the elbow-pipe F and its two curved and obliquely-attached educts, through which it passes.

There is no check produced by sudden contraction or expansion of the passages, nor by an abrupt change of direction.

If provision were not made for the free escape of the gaseous products which accompany the sparks into the receiver, it is obvious that no current would be established through the same, and but few sparks be deposited in the receiver, the greater portion passing out at the educts H. It is to create a current through the receiver C, and to insure the deposition of the sparks therein, that I provide the said receiver with an educt or opening distinct from the opening *e*.

In the drawing, the educts D D are shown as provided with perforated coverings *c c*, and the receiver C is shown as hinged to the smoke-box B, so that it may be readily turned to one side, if necessary.

Having thus described my invention, what I claim as new is—

1. In a spark-arrester, the separator, consisting of the elbow-pipe F, provided with two curved educts, H H, at the sides, the said educts being joined to the elbow-pipe obliquely, in such a manner as to form with the elbow continuous and somewhat spiral passages, whereby the escape of the smoke and gases is not retarded by abrupt deflection, all substantially as herein set forth.

2. In a spark-arrester, the combination of the elbow-pipe and educts F H H for separating the sparks, the conduit I, leading therefrom to the receiver, and the receiver C, provided with an opening, *e*, into the conduit, and an opening, D, into the outer air, all substantially as set forth.

3. In a spark-arrester, the combination of a separator, constructed as described, and mounted on the chimney, with a conduit leading from the said separator to a receiver, and a receiver provided with an inlet for the sparks and some portion of the gaseous products, an outlet at the upper part for the escape of the gases only, and a suitable hand-hole or opening for the discharge or removal of the accumulated sparks, all as and for the purposes substantially as set forth.

FRANK M. STEVENS.

Witnesses:
SAM. TRO. SMITH,
HENRY CONNETT.